United States Patent [19]
Pratt et al.

[11] Patent Number: 4,778,150
[45] Date of Patent: Oct. 18, 1988

[54] NON-ROTATING STEM VALVE

[75] Inventors: Robert B. Pratt, Erie; Stephen G. Ratkowski, North East; Donald J. Kalivoda, Erie, all of Pa.

[73] Assignee: Autoclave Engineers, Inc., Erie, Pa.

[21] Appl. No.: 22,992

[22] Filed: Mar. 6, 1987

[51] Int. Cl.⁴ ..................... F16K 31/50; F16K 41/04
[52] U.S. Cl. ................... 251/214; 251/122; 251/268; 251/274; 277/112
[58] Field of Search ............. 251/122, 214, 215, 223, 251/266, 267, 268, 269, 274; 277/110, 112

[56] References Cited

U.S. PATENT DOCUMENTS

| | | | |
|---|---|---|---|
| 272,827 | 2/1883 | Zellers | 251/268 |
| 682,688 | 9/1901 | Hart | 251/214 |
| 1,495,761 | 5/1924 | Moussette | 251/214 |
| 2,887,293 | 5/1959 | Gasche | 251/274 |
| 3,049,332 | 8/1962 | Webster | 251/274 |
| 3,204,925 | 9/1965 | Montouri | 251/274 |
| 3,269,698 | 8/1966 | Koch | 251/214 |
| 3,761,053 | 9/1973 | Bedo et al. | 271/122 |
| 3,857,410 | 12/1974 | Bedo et al. | 251/214 |
| 3,976,279 | 8/1976 | Walker | 251/214 |
| 4,114,851 | 9/1978 | Shivak et al. | 251/214 |

Primary Examiner—George L. Walton
Attorney, Agent, or Firm—Webb, Burden, Ziesenheim & Webb

[57] ABSTRACT

A rising stem valve comprising a valve body, a two part valve stem and a stem guide washer. The valve body has a valve seat in a passage between an inlet and outlet port. The two part valve stem comprising a rotating stem and a non-rotating stem and the rotating stem has a threaded bore receiving a threaded end of the non-rotating stem. The non-rotating stem has a non-circular cross section external of the threaded bore and is adapted to carry a closure head to the valve seat. The stem guide washer has a bore positioned in mating relationship with the noncircular cross section of the non-rotating stem, whereby the stem guide washer prevents the stem from rotating when the upper stem is rotated.

5 Claims, 1 Drawing Sheet

NON-ROTATING STEM VALVE

FIELD OF THE INVENTION

This invention relates to valves and more particularly to valves adapted to sample coolant in nuclear reactors.

DESCRIPTION OF THE PRIOR ART

Nuclear reactors typically have many locations throughout the water coolant flow path where test samples must be taken. The sampling of coolant in nuclear reactors requires a special type of valve. The control of flow is important, but more important is that the valve maintain its sealing ability despite the high pressure and temperatures and corrosive conditions present in a reactor. The valve must open and reseat many times over its useful life. Repeatability is very important.

The valve disclosed herein is a non-rotating stem valve. Valves of this general type are known, for example, as shown in Gasche U.S. Pat. No. 2,887,293 and Gulick U.S. Pat. No. 3,269,693. In this type of valve, the valve head is prevented from rotating relative to the valve seat when the valve is opened or closed. This prevents galling and excessive wear of the seat, thus resulting in a longer lasting valve.

SUMMARY OF THE INVENTION

It is an advantage according to this invention to eliminate the need for extremely small tolerances on the non-rotating valve stem, as is required by the prior art.

It is a further advantage of this invention to provide a simple and effective arrangement for preventing rotation of the non-rotating valve stem.

It is yet another advantage to provide a valve structure enabling easy and accurate field adjustments of the packing surrounding a portion of the valve stem. This is accomplished by the packing gland's ability to receive sufficient torque and enables the packing to extrude around the lower stem forming a seal and prevents rotation of the stem guide washer by frictional forces created from the stem guide washer being in compression with the packing gland and packing.

It is yet a further advantage according to this invention to provide an improved sealing arrangement by the use of a packing assembly which comprises a plurality of washers sandwiching the packing. This evenly distributes compressive forces and extrudes the packing around the lower valve stem. Although pressures can reach up to 30,000 psi in the system the packing gland torque required to create an effective seal on our invention is only 60 foot-pounds.

It is yet another advantage that the non-rising, upper, external stem does not violate the original space envelope as is common with other valves, thus minimizing interferences with surrounding equipment when installed.

It is still another advantage that precise external stem adjustments are eliminated. Misadjusted stems are a primary cause of stem binding which promotes stem rotation and subsequent wear and leakage.

This invention is an improved valve having a non-rotating valve stem. The valve includes a body having a valve seat; a rotating stem having a threaded bore; and a non-rotating stem threadably engaged within the threaded bore of the rotating stem and adapted to seat at its distal end to the valve seat. The non-rotating stem has a noncircular section which is external of the threaded bore. A stem guide washer has a bore which is geometrically similar to the non-rotating stem noncircular section. The stem guide washer receives the noncircular section, and cooperates with the valve body, whereby the stem guide washer prevents the non-rotating stem from rotating when the rotating stem is rotated.

A packing surrounds the non-rotating stem and is received in the valve body. The packing may be fluorinated hydrocarbon, glass filled fluorinated hydrocarbon, such as Teflon or glass filled Teflon or a graphite based packing material suitable for higher temperature service. A packing gland has a bore for telescoping over the rotating stem and the non-rotating stem. The gland threadably engages the valve body and is adapted to receive sufficient torque to prevent rotation of the stem guide washer and extrudes the packing around the lower stem forming a seal between the inlet and outlet ports and the threads.

The packing may be replaced by a packing assembly comprising a plurality of washers sandwiching the packing. The packing assembly surrounds the non-rotating stem. The valve body receives the packing assembly. The packing assembly cooperates with the stem guide washer, whereby compressive forces are distributed evenly throughout the packing forming a seal around the non-rotating stem bottom.

The stem guide washer bore and the lower stem noncircular section may be noncircular or polygonal in cross section, preferably rectangular, hexagonal, most preferredly square.

A specific embodiment of the invention comprises a non-rotating stem, a handle, a non-rotating reciprocating valve stem, a packing gland, packing, a plurality of packing washers, a thrust washer, and a stem guide washer. The rotating stem has two sections, a cylindrical first section and a cylindrical second section, where the second section has a diameter greater than the first section. The rotating stem has an axial threaded bore at the end adjacent the non-rotating stem. The handle cooperates with the cylindrical first section of the upper stem. The non-rotating valve stem has three sections, a threaded top section for engaging the rotating stem bore, a middle bearing section having a noncircular shape such as a square, and a bottom section supporting the valve closure head. The packing gland has a stepped bore. The cylindrical first section and cylindrical second section of the rotating stem abut the two portions of the stepped bore respectively. A stem guide washer has a bore geometrically similar to the cross section of the non-rotating stem middle bearing section, in which the middle bearing section is received. The stem guide washer has four radial surfaces comprising two end surfaces and two annular step surfaces between three cylindrical surfaces. The stem guide washer abuts the rotating stem. An annular surface on the stem guide washer abuts the packing gland. A plurality of packing washers sandwich the packing, forming a packing assembly. The packing may be graphite or Teflon or glass filled Teflon. The packing assembly receives the non-rotating stem and cooperates with the valve body and the stem guide washer. The valve body has an inlet port, an outlet port and a valve seat. The valve body also has internal threads engaging with the external threads of the packing gland. The packing gland is adapted to receive sufficient torque and compress said valve assembly; whereby, the packing forms a seal about the lower stem bottom section. The valve head is prevented from rotating on the valve seat when the upper stem is rotated, by the frictional forces created from the valve assembly being in compression with the valve body preventing rotation of the stem guide washer. Only minimial gland torque is required to prevent rotation of the stem guide washer. Torque required for compression of the valve packing is more than adequate to prevent stem guide washer rotation.

DESCRIPTION OF THE PREFERRED EMBODIMENT

Figure 1:
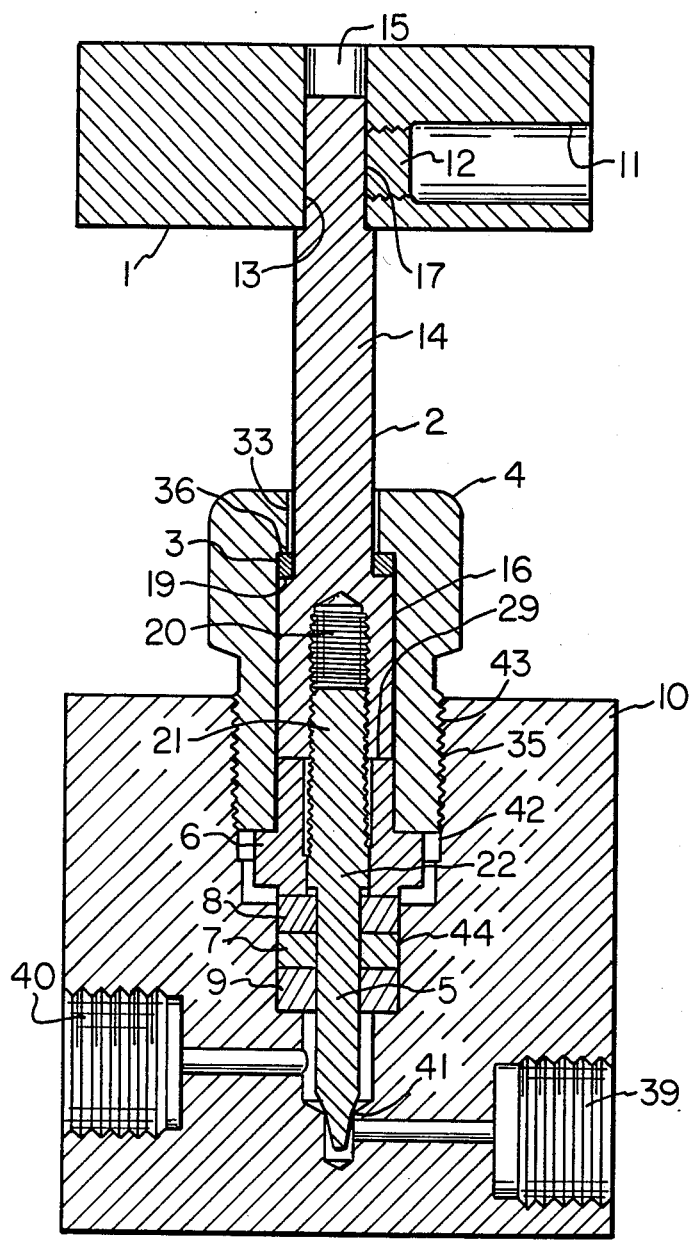
FIG. 1 is a sectional side view of the valve illustrating the invention.

Referring now to FIG. 1, the main components of the valve include a handle 1, rotating stem 2, thrust washer 3, packing gland 4, non-rotating stem 5, stem guide washer 6, packing 7, packing washers 8 and 9, and valve body 10.

The handle 1 has an extruded shape, although any shape may be used, and has a longitudinal bore 11 beginning at one end of the handle 1 and is at least half the length of the handle 1. The bore 11 receives a set screw 12. An axial opening 13 in the handle 1 is of sufficient size to receive the rotating stem 2 and intersects the longitudinal bore 11. Preferably, the top of the handle is provided with a socket 15, say for a ¼ inch drive socket wrench, for receiving a torque wrench. A leak-free valve depends on minimizing or eliminating distortion of the seat/stem contact band. Seat distortion and subsequent leakage is promoted by stem rotation and overtorquing. Therefore, in addition to eliminating stem rotation, it is also important to minimize overtorquing of the seat. This valve design provides for convenient direct application and monitoring of precise seating torques. This is accomplished by providing a ¼ inch rectangular hole in the valve handle which directly accepts a ¼ inch drive calibrated torque wrench. Previously special adapters from the torque wrench to the valve handle have been required. These adapters are not always available when needed.

The rotating stem 2 has a first cylindrical section 14 integral with a second cylindrical section 16. The first section 14 has a flat surface 17 for abutting the set screw 12. The second cylindrical section 16 has a larger diameter than the first cylindrical section 14. There is a radial shoulder 19 between the first section 14 and the second section 16 of the rotating stem. A thrust washer 3 has an inner diameter sufficient to receive the first section 14 and approximately the same outer diameter as the second section 16. The thrust washer 3 surrounds the first section 14 of the rotating stem and is seated on the shoulder 19. The second section 16 has a threaded bore 20 to receive a non-rotating stem upper section 21.

The non-rotating stem 5 has three integrally formed sections—an upper threaded section 21, a middle bearing section 22, and a lower sealing section 23. The upper section 21 has external threads, and is threadably received by the threaded bore 20 of the rotating stem. The middle bearing section 22 has a noncircular cross sectional shape, such as a square, externally of the threaded bore 20 and has a larger size projection than either the upper section 21 or lower section 23. The cylindrical lower section 23 has a valve closure head 24 at its distal end.

The stem guide washer 6 has a bore 25 geometrically similar to the cross section of middle section 22. The middle section 22 is received by the stem guide washer 6. The stem guide washer 6 has three cylindrical surfaces with different diameters—a first diameter 26, a second diameter 27 and a third diameter 28. The first diameter 26 is approximately the same size as the diameter of the rotating stem second section 16. The second diameter 27 is larger than the first. The third diameter 28 is approximately the same diameter as the packing 7. The stem guide washer 6 has four radial surfaces, a first end surface 29, a second end surface 30, a third annular surface 31 and a fourth annular surface 32. The first end surface 29 and second end surface 30 are at opposite ends of the stem guide washer 6. The third surface 31 is formed at the interface between the first diameter surface 26 and second diameter surface 27. The fourth surface 32 is formed between the cylindrical surfaces 27 and 28.

The packing gland 4 has a stepped bore with two inner diameters 33 and 34. External threads 35 are on the outer diameter of the packing gland 4 beginning at the end having the larger inner diameter bore. A shoulder 36 is formed at the interface of the two bores of diameters 33 and 34. The packing gland receives the rotating stem 2 whereby the smaller bore diameter 33 receives the cylindrical first section 14 and the larger inner bore diameter 34 receives the cylindrical second section 16 of the rotating stem. The top face of the thrust washer 3 abuts the packing gland shoulder 36 and the other face 38 of the thrust washer 3 abuts the shoulder 19 on the rotating stem whereby the thrust washer acts as bearing between the packing gland shoulder 36 and the upper stem shoulder 19.

The valve body 10 has an inlet port 39 and an outlet port 40 and a valve seat 41 therebetween. The valve seat 41 receives the valve closure head 24 whereby a seal may be formed preventing flow from the inlet port 39 to the outlet port 40. The valve body 10 has a central bore 42 having threads at the end opposite the valve seat. The internal threads 43 of the bore 42 receive the external threads 35 on the packing gland.

The packing 7 has an inner diameter approximately equal to the non-rotating stem bottom sealing section 23 and an outer diameter approximately equal to the sealing bore 44 of the valve body 10. Preferably, the packing is a fluorinated hydrocarbon such as DuPont brand Teflon or its equivalent. Teflon is chemically and physically stable at the elevated temperatures and pressures and corrosive conditions in which this valve is subjected. Teflon also has a low coefficient of friction which minimizes the force required to move the lower stem. The packing may also be glass filled Teflon, high temperature graphite or equivalent.

The packing washers 8 and 9 sandwich the packing material 7. The packing washers 8 and 9 approximately have the same outer and inner diameters as the packing 7.

Figure 2:
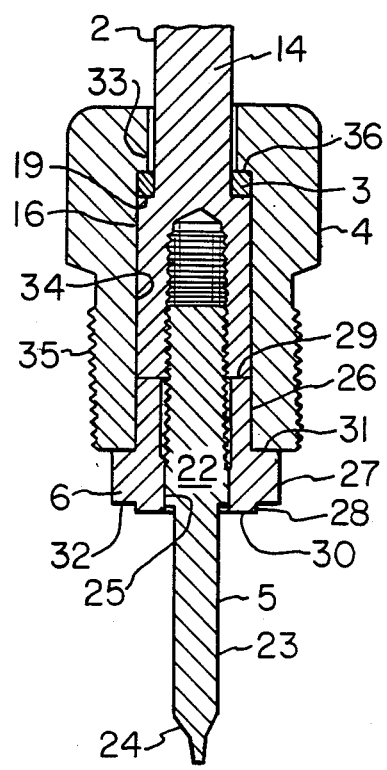
FIG. 2 is a sectional side view of the packing gland assembly.

The packing gland 4 receives the thrust washer 3, upper stem 2, and lower stem 5. The stem guide washer 6 receives the lower stem middle section 22 and the packing gland 4 receives the stem guide washer 6. The packing gland 4 cooperates with the stem guide third surface 30. The upper stem 2, second section 16, abuts the stem guide first surface 29. This assembly is known as the packing gland assembly as shown in FIG. 2.

The valve body sealing bore 44 receives the packing 7 and packing washers 8 and 9. The bottom packing washer 9 cooperates with the valve body 10. The packing gland assembly is threadably engaged in the valve body bore 42. The packing and packing washers 8 and 9 receive the lower stem bottom section 23. The top packing washer 8 cooperates with the stem guide washer second surface 31. Sufficient torque is applied to the packing gland 4 of the assembled valve so that the packing 7 forms a seal about the lower stem bottom section 23 whereby the sealed media is prevented from leaking to the outside environment.

The applied torque to the packing gland 4 also prevents the rotation of the stem guide washer 6 and lower stem 5 when the upper stem 2 is rotated. This is due to the resultant frictional forces caused by the compression of the packing gland 4, stem guide washer 6 and valve body 10. To actuate the valve the operator turns the handle 1. The valve head 24 traverses axially without relative rotation to the valve seat 41 due to the threaded interconnection of the upper stem 2, the lower stem 5, and the stem guide washer 6.

Except for the packing material 7 all of the components may be made of stainless steel.

The non-rotating stem valves can be made to fit a number of diameter pipes or tubes. A valve having a lower stem bottom section diameter 23 of 0.186 inch required 60 foot-pounds of torque and maintained a seal at 30,000 pounds per square inch.

Various modifications can be made to the subject invention as fall within the scope of the following claims.

We claim:

1. In a rising stem valve of the type including a valve body defining a stepped central bore having a larger diameter portion and a smaller diameter portion and a step therebetween, internal threads over the larger diameter portion thereof and a valve seat at the axial end of a smaller diameter portion, a rotating stem, a non-rotating stem threadably engaged with said rotating stem, said non rotating stem adapted to seat at one end to the valve seat when positioned within the stepped central bore, a packing and a packing gland having external threads for engaging the internal threads on the central bore the improvement comprising:

a stem guide washer having first and second end surfaces and an annular surface, said packing and said stem guide washer both surrounding the non-rotating stem, said stem guide washer and non-rotating stem having a non-interfering fit with the central bore, the gland and the packing, said non-rotating stem having a noncircular section and said stem guide washer having a bore geometrically similar to the noncircular section of the non-rotating stem such that the non-rotating stem can slide axially within the stem guide washer but cannot rotate within the stem guide washer, said packing being captured between the stem guide washer and a step of the stepped central bore, said rotating stem having an end portion disposed directly above and facing said first end surface, said packing gland having an end face bearing only upon said annular surface and said second surface abuttingly engaging said packing such that the packing gland can be tightened sufficiently to prevent rotation of the stem guide washer when the rotating-valve stem is turned and to extrude the packing around said non-rotating stem forming a seal.

2. The valve in claim 1 the improvement further comprising:

washers sandwiching said packing material forming a packing assembly, said packing assembly receiving said non-rotating stem, said body receiving said packing assembly, said packing assembly cooperating with said stem guide washer, whereby compressive forces extrude said packing around said non-rotating stem bottom section forming a seal.

3. The valve of claim 1 wherein said stem guide washer bore and said noncircular section is rectangular or hexagonal in cross section.

4. The valve of claim 1 wherein said packing material is one of the group of fluorinated hydrocarbon, glass filled fluorinated hydrocarbon and high temperature graphite.

5. A valve according to claim 1 wherein the rotating stem is provided with a handle and the handle is provided with a socket for receiving a valve stem.

* * * * *